US009038484B2

United States Patent
Seibold

(10) Patent No.: US 9,038,484 B2
(45) Date of Patent: May 26, 2015

(54) FORCE/MOMENT SENSOR FOR MEASUREMENT OF FORCES AND MOMENTS

(75) Inventor: Ulrich Seibold, Burnaby (CA)

(73) Assignee: Deutsches Zentrum Fur Luft-Und Raumfahrt E.V., Cologne (DE)

( * ) Notice: Subject to any disclaimer, the term of this patent is extended or adjusted under 35 U.S.C. 154(b) by 191 days.

(21) Appl. No.: 13/416,895

(22) Filed: Mar. 9, 2012

(65) Prior Publication Data
US 2012/0234104 A1 Sep. 20, 2012

(30) Foreign Application Priority Data

Mar. 15, 2011 (DE) .......................... 10 2011 014 005

(51) Int. Cl.
*G01L 1/22* (2006.01)
*G01L 5/16* (2006.01)

(52) U.S. Cl.
CPC ...................................... *G01L 5/161* (2013.01)

(58) Field of Classification Search
CPC ....................................................... G01L 5/161
USPC ...................................... 73/862.045, 862.042
See application file for complete search history.

(56) References Cited

U.S. PATENT DOCUMENTS

| | | | | |
|---|---|---|---|---|
| 4,836,034 A * | 6/1989 | Izumi et al. | ............... | 73/862.044 |
| 6,388,655 B1 * | 5/2002 | Leung | ............................ | 345/157 |
| 6,823,744 B2 * | 11/2004 | Ohsato et al. | ............ | 73/862.041 |
| 7,360,456 B2 * | 4/2008 | Morimoto | ................ | 73/862.044 |
| 8,250,934 B2 * | 8/2012 | Sakurai | .................... | 73/862.044 |
| 2004/0045372 A1 | 3/2004 | Liu et al. | | |

FOREIGN PATENT DOCUMENTS

| | | |
|---|---|---|
| DE | 3838810 A1 | 5/1990 |
| DE | 10032363 A1 | 1/2001 |
| DE | 10013059 | 9/2001 |
| DE | 10217019 | 7/2003 |
| DE | 10217018 A1 | 11/2003 |
| WO | 2004106877 A1 | 12/2004 |
| WO | 2010066296 A1 | 6/2010 |
| WO | 2011069515 A2 | 6/2011 |

OTHER PUBLICATIONS

Office Action in corresponding German Patent Application No. 10 2012 202 917.6.
European Search report in corresponding European Patent Application No. 12 170 233.6.

* cited by examiner

*Primary Examiner* — Harshad R Patel
(74) *Attorney, Agent, or Firm* — Ohlandt, Greeley, Ruggiero & Perle, LLP

(57) ABSTRACT

A force/moment sensor for measurement of three orthogonal forces and three orthogonal moments, comprises an inner holding element which is surrounded by an outer holding element. The two holding elements are connected to each other by deformation elements. For each deformation element, at least one deformation transducer is provided. The force/moment sensor is preferably monolithic, and the deformation transducers, formed as strain gauges, are preferably arranged in one plane or in two preferably parallel planes.

14 Claims, 2 Drawing Sheets

(STATE OF THE ART)

FORCE/MOMENT SENSOR FOR MEASUREMENT OF FORCES AND MOMENTS

BACKGROUND OF THE INVENTION

1. Field of the Invention

The present invention relates to a force/moment sensor for measurement of particularly three orthogonal forces and three orthogonal moments.

2. Description of the Prior Art

For measurement of three forces and three moments, a monolithic force/moment sensor is known from DE 102 17 018. This known sensor comprises two circular cylindrical rings arranged at an axial distance from each other. The two rings are connected to each other via six rods of identical length which are distributed along the periphery at uniform intervals. On said rods, strain gauges are arranged. With the aid of the strain gauges, three orthogonal forces and three orthogonal moments can be determined. The connection between the six rods and the two circular cylindrical rings is realized respectively via flexure hinges. The strain gauges are connected via electric lines to an evaluation unit for determining the forces and moments. Such a force/moment sensor, however, has the disadvantage that the manufacture as a monolithic component is extremely complex and thus expensive. Further, such a force/moment sensor has a large size particularly in the axial direction so that the range of applications of such a force/moment sensor is restricted.

A relatively flat-sized force/moment sensor from ATI Industrial Automation, Apex, N.C., USA, available under the trade name ATI-Nano 43, is schematically shown in FIG. 1. This sensor comprises an outer holding element 10 surrounding an inner holding element 20. The two holding elements 10,20 are connected to the respective components between which the occurring forces and moments shall be measured. The two holding elements are connected to each other via three deformation elements 12. The deformation elements 12 comprise a first component in the form of a beam having a substantially quadratic cross section. Via a support member 16, said beam is connected, at the ends 18 of support member 16, to the outer holding element 10. On the top and bottom sides 22 and the two lateral surfaces 24 of the beam 12, a respective strain gauge 26 is arranged. Since the force/moment sensor shown in FIG. 1 comprises three deformation elements arranged at regular intervals on the periphery of the inner holding element 20, this results in a total of twelve deformation transducers in the form of the strain gauges 26. The above arrangement allows for the detection of three forces and three moments. Particularly when using such a sensor in surgical instruments, a central opening 28 is important for allowing instruments and other components to be passed through. On the other hand, the outer dimensions of the sensor should be as small as possible. For this reason, a miniaturization of such a force/moment sensor to an outer diameter of less than 20 mm is not possible, particularly because of the need to provide sufficient mounting space for the strain gauge arranged laterally on the beam 14. Also, the problem exists that a still further reduction of the material volume at the clamping points might cause a twisting of the structure, which would impair the measurement results.

From DE 102 17 019, a further monolithic force/moment sensor is known. An inner holding element is connected via three strut-shaped deformation elements to three outer holding elements. The outer holding elements extend between the outer ends of the substantially radially arranged strut-shaped deformation elements. Different deformation transducers, such as e.g. strain gauges, for capturing linear forces or shear forces, are arranged both on the top sides of the deformation elements and on the three outer holding elements. Thus, the outer elements serve, on the one hand, as holding elements for holding the sensor and, on the other hand, also as deformation elements, since it is only by deformation of these elements that corresponding forces can be detected via the deformation transducers. This particularly has the disadvantage that, when the force/moment sensor is mounted, the attachment process may cause tension at the outer holding elements. Thereby, the measurement results may be adversely affected.

From DE 100 13 059, there is further known a force/moment sensor with an outer holding element and an inner holding element. Provided on the inner holding element is a stamp extending in the longitudinal direction and serving to accommodate the corresponding deformation transducer elements. Further, deformation transducer elements are provided both on the upper side and on the lower side of the outer holding element. Also in this force/moment sensor, the measurement results may be affected due to the tension occurring when the sensor is being fastened.

It is an object of the invention to provide a force/moment sensor which is suited particularly for the measurement of three preferably orthogonal forces and three preferably orthogonal moments, and which is simple in construction so as to allow particularly for strong miniaturization.

According to the invention, the above object is achieved by the features as disclosed herein.

SUMMARY OF THE INVENTION

The force/moment sensor according to the invention, which is suited particularly for the measurement of three preferably orthogonal forces and three preferably orthogonal moments, comprises an inner and an outer holding element. The outer holding element, preferably having an annular shape, surrounds the inner holding element which preferably is also annular or disk-shaped. The two holding elements are connected to each other via at least the three, preferably at least six deformation elements. Optionally, the number of deformation elements can be increased to more than six deformation elements, e.g. in order to perform redundant measurements.

On each deformation element, there are preferably arranged at least one, preferably at least two and with particular preference exactly two deformation transducers such as e.g. strain gauges. In the force/moment sensor of the invention, it is possible to arrange the deformation transducers in one plane or two—preferably parallel—planes. The deformation transducers can be arranged on a top side and/or a bottom side of the preferably flat force/moment sensor. The resultant advantage, which is typical of the invention, is the elimination of the need to arrange deformation transducers laterally on a bending bar. This allows for a further miniaturization, wherein a miniaturization can be achieved to the effect that the force/moment sensor has an outer diameter of less than 20 mm, particularly less than 10 mm.

With particular preference, no deformation transducers are provided on one and preferably both of the holding elements, whereas both deformation transducers are arranged on the deformation elements. In such an arrangement, the deformation elements are preferably arranged in such a manner that the two holding elements are connected by the deformation elements. By providing the deformation elements exclusively on the deformation transducers, negative influences during the process of attaching the holding elements, such as e.g. tension occurring in the process, can be avoided or at least be considerably reduced. Thereby, it is allowed to give the holding elements more stiffness. This can be realized by producing the holding elements of a material different from that of the deformation elements, by forming the holding elements with a different geometrical configuration, e.g. with a different thickness, or by providing stiffening webs. If the holding elements and the deformation elements are produced from a plastic material, an increase of stiffness could also be achieved by inclusion of fibers or the like into the holding elements.

Preferably, the individual deformation elements are formed symmetrically. Particularly, neither a top side nor a bottom side has recesses or projections provided on it that would result in an asymmetrical design. This has the advantage that, in case that the deformation elements or the whole sensor undergo an increase of temperature, there will occur a uniform expansion in radial direction. Thereby, faulty measurements caused by warping are avoided.

It is particularly preferred that both the two holding elements and the at least six deformation elements are one-pieced, particularly monolithic. In this case, it is also possible to produce these component parts of the force/moment sensor together, wherein the production can be performed e.g. by 2D wire erosion. Thus, the production is considerably facilitated in comparison to a three-dimensional complex force/moment sensor as described in DE 102 17 018.

The connection of the deformation elements to the two holding elements is realized with the aid of flexure hinges. A provision of separate joints which are mounted with difficulty and which require a large constructional space, will thus not be required. Thereby, also the occurrence of possibly cumulating tolerances can be avoided, thus considerably improving the quality of the measurement results.

According to a particularly preferred embodiment of the force/moment sensor of the invention, the inner holding element comprises a preferably central opening so that the inner holding element in the preferred embodiment has an annular shape. In case of an outer diameter of about 10 mm, the force/moment sensor of the invention makes it possible to realize an opening in the inner holding element for passage of instruments or other components of a diameter of 3.5 mm.

With particular preference, the deformation elements are arranged in a regular manner, particularly with rotational symmetry. In case of a disk- or ring-shaped inner holding element, the deformation elements are preferably arranged symmetrically on its periphery. In such a case, it is preferred that one deformation transducer such as e.g. a strain gauge is provided per deformation element. Herein, for measurement of three forces and three moments, three linear strain gauges and three shear-type strain gauges are provided. These are preferably arranged alternately. Further, it is preferred that all deformation transducers are arranged in the same plane, e.g. on the top side or on the bottom side of the deformation elements.

With preference, all deformation elements are of an identical design. The deformation elements are preferably T-shaped in plan view. In this case, it is preferred that two ends of the T-shaped deformation element are connected to the outer holding element and one end is connected to the inner holding element. In such an arrangement, the deformation elements are preferably configured to the effect that a first web of the T-shaped deformation elements is arranged radially and the other web tangentially, relative to a central circular line and, respectively, to an annular holding element.

If a plurality of deformation elements are provided, particularly in a star-shaped regular arrangement, it is preferred that deformation transducers for capturing linear forces are arranged alternately with deformation transducers for capturing shear forces.

According to a particularly preferred embodiment, the force/moment sensor of the invention comprises three, preferably at least six deformation elements. It is in this case preferred that one deformation transducer is provided per deformation element. However, it is also possible to provide additional deformation elements which serve for stiffening the structure but which have no deformation transducers arranged on them.

A further advantage of the force/moment sensor of the invention in a preferred embodiment thereof resides in that some, and preferably all, of the deformation transducers can be realized as film-type strain gauges. In this case, individual ones or all of the deformation transducers can be formed in a common film. Thereby, an accurate arrangement of the deformation transducers and particularly an accurate orientation of the individual deformation transducers relative to each other are guaranteed in a simple manner.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
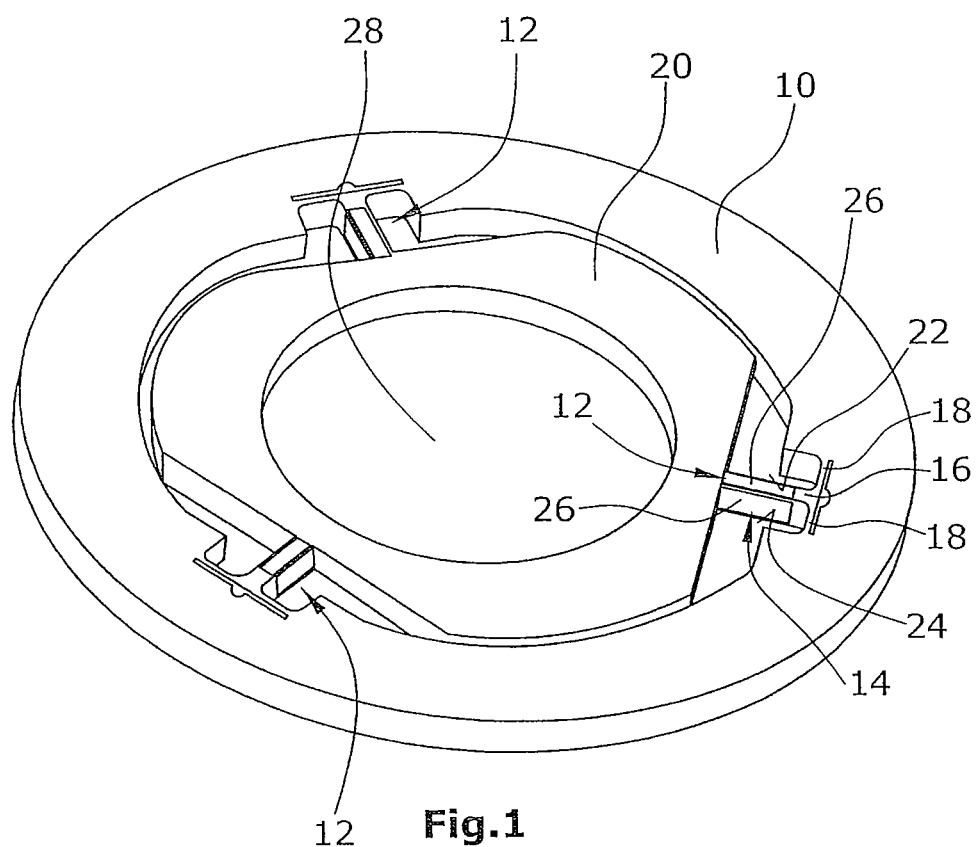
FIG. 1 is a schematic perspective view of a force/moment sensor according to the state of the art.

The force/moment sensor according to the invention (FIGS. 2 and 3) comprises, in its illustrated preferred embodiment, a substantially circular inner holding element 30 which is surrounded by an outer holding element 32 being also substantially circular. The two holding elements 30,32 are connected to each other via six deformation elements 34 arranged with a regular distribution on the periphery of the inner holding element 30. When seen in plan view, the individual deformation elements 34 (FIG. 2) are T-shaped. The identically shaped deformation elements 34 comprise a deformation bar 36 and two connection webs 38 connected to deformation bar 36. Relative to the circular inner holding element 30, deformation bar 36 is arranged radially, with the two connection webs 38 extending tangentially. On its inward end, the deformation bar 36 is connected to the inner holding element 30. The two connection webs 38 are by their outer ends connected to the outer holding element 32.

Figure 2:
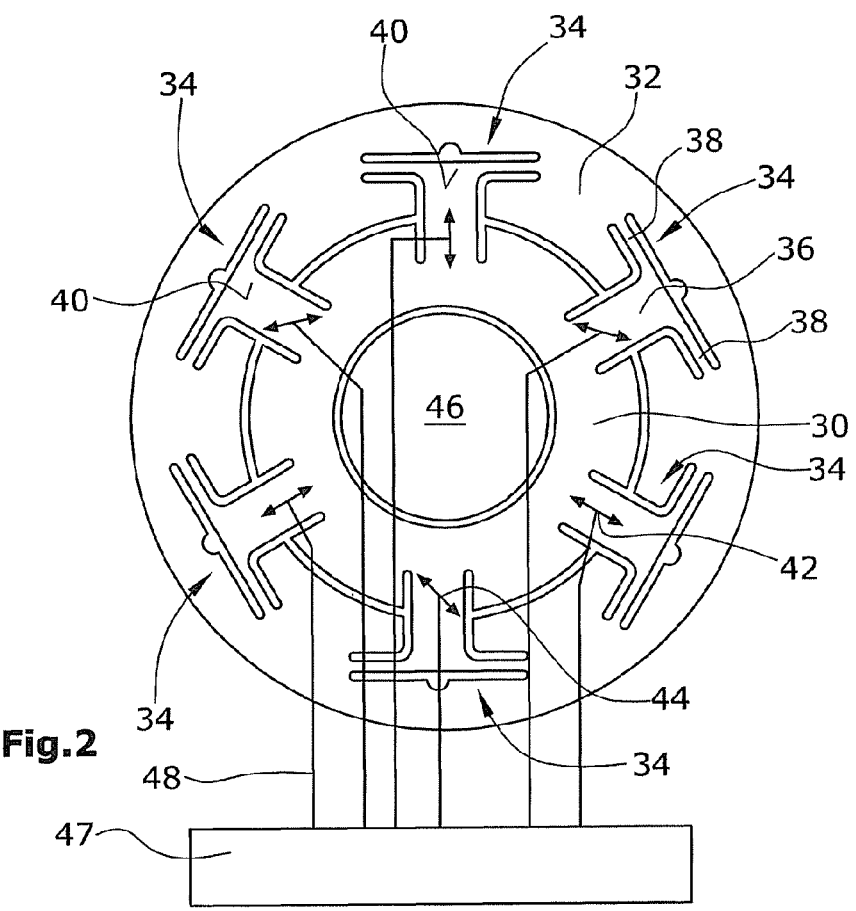
FIG. 2 is a schematic plan view of a preferred embodiment of the force/moment sensor according to the invention.

On each top side 40 of the deformation elements 34, there is arranged a deformation transducer in the form of a strain gauge. In FIG. 2, the strain gauges are represented by arrows 42, 44, wherein the arrows 44 represent linear strain gauges and the arrows 42 represent shear-type strain gauges. The deformation transducer 42, 44 are connected, via electrical lines 48 and/or optical lines (not shown), to an evaluation unit 47 for determining three orthogonal forces and three orthogonal moments.

The inner holding element 30 comprises a central opening 46, being of a circular shape in the illustrated embodiment, for passing instruments, component parts and the like through it.

Particularly, said opening 46 serves for passing therethrough surgical instruments when using the force/moment sensor of the invention in medical apparatus.

Figure 3:
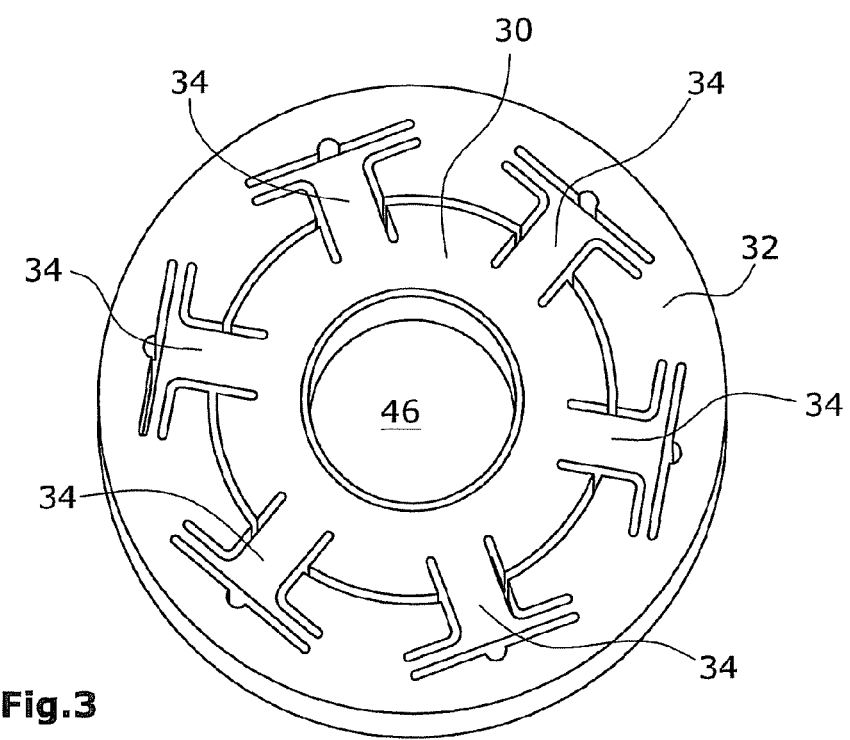
FIG. 3 is a schematic perspective view the a force/moment sensor shown in FIG. 2.

As evident particularly from FIG. 3, the force/moment sensor of the invention is a flat, substantially two-dimensional, monolithic force/moment sensor. In case of an outer diameter of e.g. 20 mm, the sensor has a thickness of merely about 1.5 mm.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A force/moment sensor for measurement of three forces and three moments, comprising:
   an inner holding element surrounded by an outer holding element,
   a plurality of deformation elements connecting the holding elements to each other, wherein the plurality of deformation elements comprises at least six deformation elements, and
   a single deformation transducer for each of the at least six deformation elements so that each of the single deformation transducers is connected to a different one of the at least six deformation elements, each of the single deformation transducers being connectible via lines to an evaluation unit,
   wherein each of the single deformation transducers is arranged exclusively on a top and/or bottom side of the plurality of deformation elements.

2. The force/moment sensor according to claim 1, wherein all of the single deformation transducers arranged on the top side are located in a common plane and all of the single deformation transducers arranged on the bottom side are located in a common plane.

3. The force/moment sensor according to claim 1, wherein the plurality of deformation elements are formed as flexure hinges and/or are connected to the inner or outer holding elements via flexure hinges.

4. The force/moment sensor according to claim 1, wherein the holding elements have a higher stiffness than the plurality of deformation elements.

5. The force/moment sensor according to claim 1, wherein the holding elements and the plurality of deformation elements are one-pieced.

6. The force/moment sensor according to claim 1, wherein the outer holding element and/or the inner holding element are annular.

7. The force/moment sensor according to claim 1, wherein each of the single deformation transducers comprises a transducer for capturing linear forces and a transducer for capturing shear forces, which are arranged alternately with each other on adjacent deformation elements.

8. The force/moment sensor according to claim 1, wherein the inner holding element comprises a central opening for passing instruments therethrough.

9. The force/moment sensor according to claim 1, wherein each of the single deformation transducers is designed as linear and/or shear strain gauge.

10. The force/moment sensor according to claim 1, wherein each of the single deformation transducers is arranged symmetrically between the inner and/or outer holding elements.

11. The force/moment sensor according to claim 10, wherein each of the single deformation transducers is arranged symmetrically on a periphery of the inner holding elements.

12. The force/moment sensor according to claim 1, wherein the plurality of deformation elements are T-shaped in plan view, with two ends thereof being connected to the outer holding element and one end being connected to the inner holding element.

13. The force/moment sensor according to claim 1, wherein the single deformation transducers are formed as a unit.

14. The force/moment sensor according to claim 13, wherein the unit is a film-type strain gauge.

* * * * *